May 8, 1962 S. C. CARR 3,034,005
ALTERNATING CURRENT GENERATOR AND REGULATING SYSTEM
Filed Sept. 2, 1958 2 Sheets-Sheet 1

INVENTOR.
SHERMAN C. CARR
BY John W. Michael
ATTORNEY

May 8, 1962 S. C. CARR 3,034,005
ALTERNATING CURRENT GENERATOR AND REGULATING SYSTEM
Filed Sept. 2, 1958 2 Sheets-Sheet 2

INVENTOR.
SHERMAN C. CARR
BY John W. Michael
ATTORNEY

United States Patent Office 3,034,005
Patented May 8, 1962

3,034,005
ALTERNATING CURRENT GENERATOR AND REGULATING SYSTEM
Sherman C. Carr, Hartford, Wis., assignor to The West Bend Company, a corporation of Wisconsin
Filed Sept. 2, 1958, Ser. No. 758,463
4 Claims. (Cl. 310—153)

This invention relates to improvements in alternating current generators and regulating systems therefor and particularly to such generators employing a constant or permanent magnetic field.

It is an object of this invention to provide an alternating current generator of this type which is particularly adapted for use with combustion engines such as used for outboard motors and other uses where it is desirable to produce useful power output at a wide range of speeds with a maximum of amperes under maximum load conditions.

Another object of this invention is to provide an alternating current generator which is of simple, compact and low cost design, is easily fitted in the available space beneath the flywheel of an outboard motor or the like, and is highly efficient and of large capacity in proportion to the size and weight of the materials used.

A still further object of this invention is to provide a regulator system for an alternating current generator which is responsive to the load demand and is rapid and efficient.

The first and second objects are accomplished by utilizing the flywheel of the motor as a rotating constant field or fields, and placing a stator with coils wound thereon in such relation to the flywheel as to be cut by the rotating field. The flywheel has permanent magnets with inwardly facing pole shoes or pieces of opposite polarity constituting field poles. The stator consist of a laminated plate-like steel core with peripherals slots and the coils are wound over the top and bottom of the plate with loops or bights nested in the slots. This arrangement can be either single or polyphase operation and up to eight poles can be placed around the periphery of the flywheel. When three phase operation is used there are eight poles in the flywheel and twenty-four slots in the periphery of the stator core. This accommodates eight coils of four turns each for each phase, each coil extends between slots which are angularly spaced 45°. Thus each coil in a phase is simultaneously acted upon in the same direction and the phases reach a peak induction contributed by all coils in the phase.

The third object is obtained by connecting the alternating current generator through a rectifier to a D.C. load and employing a regulator reactor consisting of a closed magnetic circuit core upon which is wound reactance coils and a D.C. control coil. Each reactance coil is connected in series with one set of generator phase coils and the rectifier. The D.C. control coil is connected in series with the D.C. load. As the load increases the current flowing through the D.C. control coil increases, thus saturating the core. This decreases induction which causes the impedance of the reactance coils to decrease resulting in an increase of the output of the alternating current generator. When the D.C. load is reduced, the current flowing through the D.C. control coil decreases, increasing the impedance of the reactance coils and thereby decreasing the generator output.

It is also practical to include with the regulator reactor a voltage sensitive regulator relay with normally closed contacts. The coil of the regulator relay is also connected across the D.C. supply. With this arrangement when the net voltage across these coils exceeds a predetermined value, the regulator contacts open. This desaturates the core of the regulator reactor and full impedance is set up reducing generator output. This will in turn reduce voltage across the voltage sensitive regulator coil and the contacts will then close again to increase generator output. The complete cycle of operation is rapidly repeated depending upon load demand.

One embodiment of this invention is illustrated in the accompanying drawings of a three phase flywheel alternating current generator, a regulating system therefor, and a D.C. load consisting of an ignition system, starter, choke, and storage battery to be charged in which.

Figure 1:
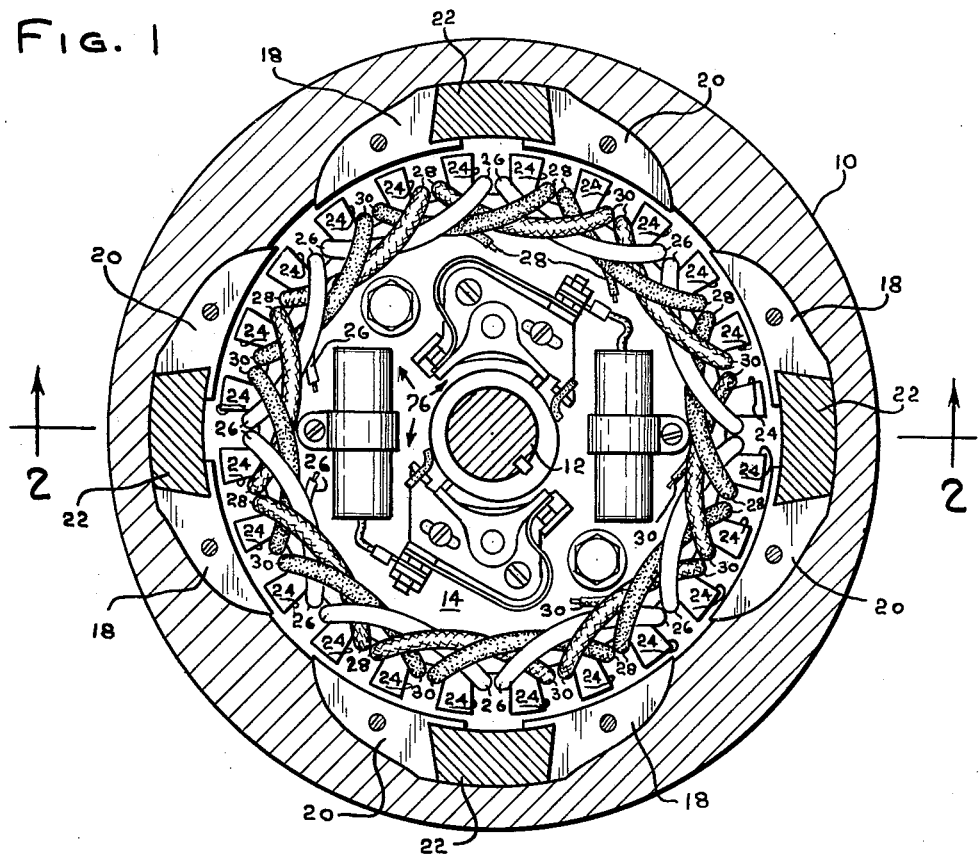
FIG. 1 is a sectional view of the flywheel alternating current generator taken on the meandering section line 1—1 of FIG. 2.

Referring to the drawings the generator and regulating system shown are particularly adapted for application on outboard motors having a starter and a 6-volt storage battery. While a three phase alternator is shown, the generator can be single phase. The generator is incorporated within a flywheel 10 mounted on the upper end of a crankshaft 12, a stator 14 being secured to the upper end of a crankcase or engine supporting base 16. Within the flywheel are four permanent magnet created fields each formed by a pair of laminated pole shoes 18 (north) and 20 (south) having curved polar faces coaxial with the axis of said crankshaft and magnetically connected by a permanent magnet 22, the shoes and magnet are held together by rivets and embedded in the flywheel in a well-known manner. The outermost ends of the shoes of a pair are angularly spaced about 75 degrees and the ends of shoes of adjacent pairs are angularly spaced about 15 degrees. As will be pointed out, this spacing permits the eight coils of a phase to be simultaneously effected by the rotating fields.

Figure 2:
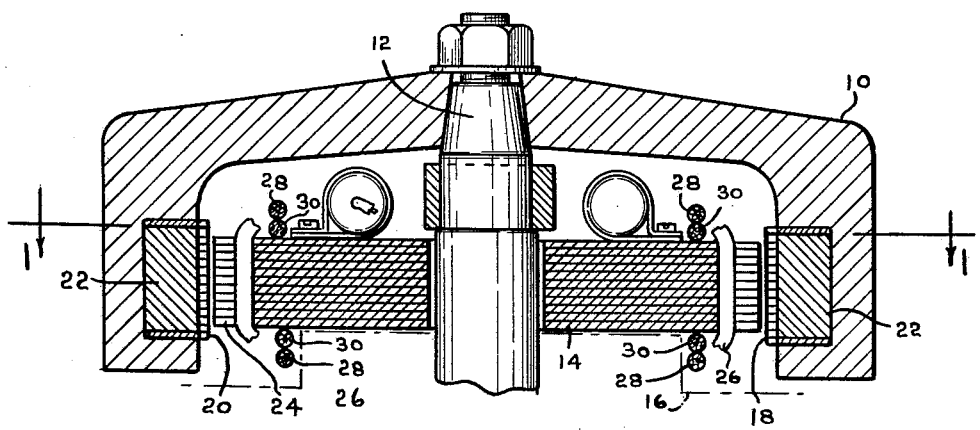
FIG. 2 is a sectional view of such generator taken on the meandering section line 2—2 of FIG. 1.

The stator 14 of the alternating current generator has a laminated plate-like steel core. The circular face of such core is spaced approximately .01 to .02 inch from the pole surfaces of the shoes 18 and 20. The periphery is provided with 24 radially inwardly directed slots 24 which are equally angularly spaced about such periphery. A three phase winding is carried by the stator. Each phase consists of eight coils of four turns each. Properly varnished and baked wires well known to those skilled in this art are used in making the coils. As is shown in FIGS. 1 and 2, coils 26 shown all white comprise the phase winding 26 diagrammatically shown in FIG. 3. Coils 28 shown in speckled shading comprise the phase winding 28 diagrammatically shown in FIG. 3. Coils 30 shown in cross-like shading constitute the phase winding 30 of FIG. 3. Each of the eight coils of a phase winding has two parts (hereafter termed bights) parallel with the axis of rotation which rest in slots which are angularly spaced 45 degrees. This means that each coil spans two slots intermediate the slots in which it rests. Only the coils of the same phase are carried in a slot. With this arrangement one bight of all the coils of one phase will pass through the peaks of induction of the four magnet fields and the other bight of such coils will pass through the lows of induction between such fields at the same time. This is illustrated in FIG. 1 in connection with the white coils 26. This creates a frequency of four cycles per phase per revolution the electrical degrees following the mechanical degrees. The coils may be laid by placing the lengthwise center of a four wire cable in a starting slot with a leg on the top and a leg on the bottom of the stator. The legs are passed through the third slot angularly removed from the starting slot from opposite directions. This is repeated. By working all of the three cables together a braided effect can be obtained as shown in FIG. 1. The proper ends of each of the coils 26, 28, and 30 are secured together to form the Y-type winding of the three phase stator symbolically shown in FIG. 3. The alternating current that generated by this arrangement will provide useful power output at all speeds from 300 to 5000 r.p.m. with a maximum of 30 amperes delivered at approximately 4500 r.p.m. under maximum load conditions.

Figure 3:
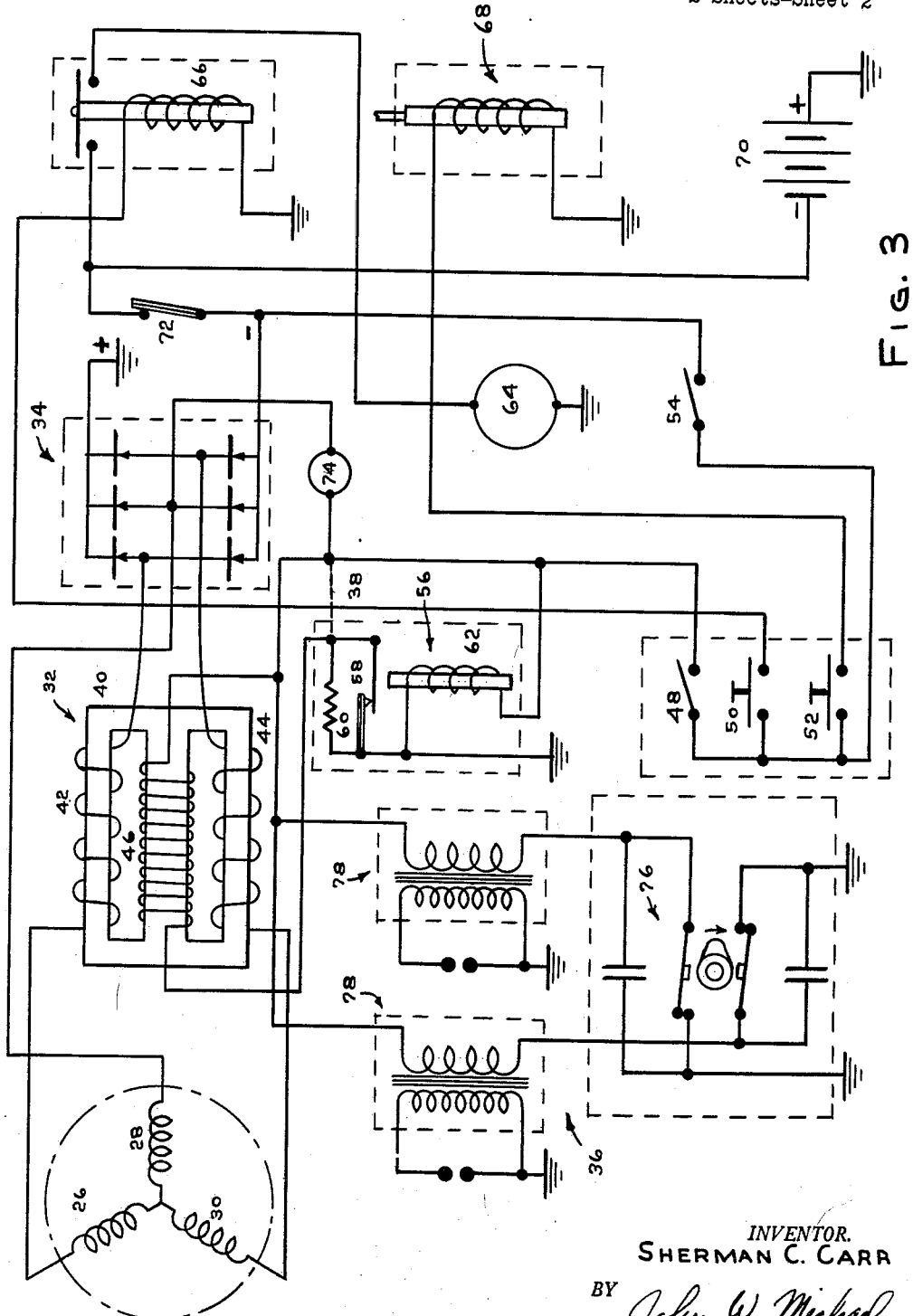
FIG. 3 is a schematic wiring diagram of such generator, regulating system, and D.C. load.

However, to accomplish proper regulation of the voltage output of the above described flywheel generator and to limit its average output to a maximum of 8 volts, the regulating system diagrammatically shown in FIG. 3 is employed. In its simplified form this system includes a saturable reactor regulator designated generally at 32, a three phase full wave rectifier designated generally at 34 and a D.C. load indicated generally at 36. The D.C. load in this instance may constitute the ignition coil, breaker points, and spark plugs of an ignition system for an outboard motor. In both this simplified system and that later described the saturable reactor 32 has a closed magnetic circuit core 40 upon which are wound two reactance coils 42 and 44 and a D.C. control coil 46. The reactance coil 42 is connected to the phase winding 26 and the reactance coil 44 is connected to the phase winding 30 and both are also connected to proper terminals of the rectifier 34 as shown. The rectifier is of well-known construction and may be a three phase full wave bridge selenium, germanium or silicon rectifier. The positive output side of the rectifier is connected to ground. The right-hand end of the D.C. control coil 46 is connected in series with the D.C. load 36. The left-hand end of this coil is connected by means of a temporary shunt indicated in broken lines at 38 through the ignition switch 48 and main key 54 to the negative side of the rectifier 34. As the D.C. load of the ignition system 36 increases, the current flowing through the D.C. control coil 46 will also increase thus causing the core 40 to reach saturation. This decreases the inductance in the saturable reactor which in turn causes the impedance of the reactance coils 42 and 44 to decrease. The result of this is to increase the output of the alternating current generator. When the D.C. load at 36 is reduced the current flowing through the D.C. control coil 46 decreases and the impedance of the reactance coils 42 and 44 is increased thereby decreasing the output of the alternating current generator.

This simplified form of regulation may not be practical in some uses, in which case a voltage sensitive regulator relay indicated generally at 56 may be employed with the saturable regulator reactor 32. The D.C. control coil 46 is connected across the D.C. supply (rectifier) in series with normally closed contact 58 of the voltage sensitive relay. An arc supressing resistor 60 is incorporated across the contacts 58. A coil 62 of the voltage regulator 56 is also connected across such D.C. supply. The temporary shunt 38 is not used in this system. With this arrangement when the net voltage across the coils 46 and 56 exceeds a predetermined value, say, close to 7.4 or 15.2 volts, the normally closed contact 58 will open. This desaturates the core of the saturable reactor regulator 32 and full impedance is set up reducing the generator output. The generator output in turn will then reduce the voltage across the voltage sensitive relay core 62 and the contact 58 will again close. This results in an increase of generator output. This cycle of operation is rapidly repeated depending upon load demand and is very sensitive.

In addition to the D.C. load 36 consisting of the ignition system there can be a starter 64, a choke 68 and a storage battery 70. The starter 64 is energized through a relay 66 connected in series with a starter button 50. The choke 68 is energized by being placed across the D.C. supply by a choke switch 52. The negative side of the storage battery 70 is connected through a thermal safety switch 72 to the negative side of the rectifier 34. A charge indicator 74 may also be connected to the negative side of the rectifier 34 through the ignition switch 48 and main switch 54 and to the winding 28 of the three phase alternator.

The ignition system indicated generally at 36 is of well-known construction and is not described in detail. It includes a cam, breaker points and capacitors in an arrangement indicated generally at 76. The breaker points and capacitors are mounted on the stator 14 within the confines of the flywheel 10 and the cam is rotated by the shaft 12. The usual ignition coil and spark plug assemblies indicated generally at 78 are employed for each cylinder.

I claim:

1. An alternating generator comprising a flywheel, four pairs of pole shoes fixed to said flywheel and angularly spaced with respect to the axis of rotation, said shoes having curved polar faces coaxial with said flywheel, a permanent magnet source of magnet flux magnetically connecting the shoes of a pair, a stator of layerized magnetic material fixedly mounted inside said flywheel within said polar faces, twenty-four equally angularly spaced slots in the periphery of said stator, and a three phase winding on said stator consisting of eight coils for each phase, each coil extending between slots spaced angularly 45 degrees, there being only parts of coils of the same phase winding lying in the same slot.

2. An alternating current generator as claimed in claim 1 in which the outermost ends of the pole shoes of one pair are angularly spaced about 75 degress whereby each coil in a phase is simultaneously acted upon in the same direction and the phase reaches a peak induction contributed by all coils in the phase.

3. A three phase alternating flywheel generator comprising a flywheel, four angularly spaced permanent magnet created constant fields rotated by said flywheel, and a stator inside said flywheel having a three phase winding consisting of eight coils per phase angularly spaced about the periphery of said stator so that all coils of a phase are simultaneously affected by said fields.

4. An alternating current generator having a constant field moving in a circular path, said constant field being created by a permanent magnet and inwardly facing pole shoes angularly spaced, and a stator within said path comprising a core of magnetic material with axial or radial slots cut therein and a coil on said stator with parts transverse to said circular path in slots angularly spaced greater than the angular length of a pole shoe and not more than the angular spacing between the outermost end of one and the innermost end of the other of said pole shoes.

References Cited in the file of this patent

UNITED STATES PATENTS

| | | |
|---|---|---|
| 2,493,999 | Riley | Jan. 10, 1950 |
| 2,693,540 | Huge | Nov. 2, 1954 |
| 2,767,368 | Kober | Oct. 16, 1956 |
| 2,866,111 | Heintz | Dec. 23, 1958 |

FOREIGN PATENTS

| | | |
|---|---|---|
| 789,031 | Great Britain | Jan. 15, 1958 |